(12) United States Patent
McDonald et al.

(10) Patent No.: US 7,981,991 B2
(45) Date of Patent: Jul. 19, 2011

(54) SEPARATION OF POLYMER SLURRIES

(75) Inventors: Michael F. McDonald, Kingwood, TX (US); Scott T. Milner, Somerville, NJ (US); Timothy D. Shaffer, Hackettstown, NJ (US); Robert N. Webb, Kingwood, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 802 days.

(21) Appl. No.: 11/788,598

(22) Filed: Apr. 20, 2007

(65) Prior Publication Data

US 2008/0262180 A1    Oct. 23, 2008

(51) Int. Cl.
*C08F 210/00* (2006.01)
*C08F 12/02* (2006.01)
*C08F 10/00* (2006.01)
*C08F 4/44* (2006.01)
*B01J 19/00* (2006.01)

(52) U.S. Cl. ............... 526/348; 526/124.3; 526/346; 526/348.7; 422/131

(58) Field of Classification Search .............. 526/348, 526/124.3, 346, 348.7; 422/131
See application file for complete search history.

(56) References Cited

U.S. PATENT DOCUMENTS

| | | | |
|---|---|---|---|
| 2,534,698 A | 12/1950 | Calfee et al. | |
| 2,542,559 A | 2/1951 | Nelson et al. | |
| 2,548,415 A | 4/1951 | Welch et al. | |
| 2,644,809 A | 7/1953 | Saylor, Jr. et al. | |
| 3,033,836 A | 5/1962 | Tegge et al. | |
| 3,470,143 A | 9/1969 | Schrage et al. | |
| 3,526,926 A | 9/1970 | Reid | |
| 5,417,930 A | 5/1995 | McDonald, Jr. et al. | |
| 5,527,870 A | 6/1996 | Maeda et al. | |
| 5,624,878 A | 4/1997 | Devore et al. | |
| 6,852,808 B2 | 2/2005 | Hüffer et al. | |
| 2006/0089467 A1* | 4/2006 | McDonald et al. | 526/124.3 |

FOREIGN PATENT DOCUMENTS

| | | |
|---|---|---|
| EP | 1 178 055 A | 2/2002 |
| JP | 59 091101 A | 5/1984 |
| RU | 2209213 | 7/2003 |
| WO | WO 00/04061 | 1/2000 |
| WO | WO 02/34794 | 5/2002 |
| WO | WO 2004/058827 | 7/2004 |
| WO | WO 2004/058828 | 7/2004 |
| WO | WO 2006/009550 | 1/2006 |

* cited by examiner

Primary Examiner — William K Cheung
(74) Attorney, Agent, or Firm — Nancy T. Krawczyk; Xiaobing Feng

(57) ABSTRACT

Methods for producing elastomers or elastomeric compositions are provided. One or more $C_4$ to $C_7$ isoolefins and one or more comonomers can be polymerized in the presence of a diluent comprising one or more hydrofluorocarbons to provide a slurry comprising polymer product, unreacted monomer and the diluent. The slurry can be extruded to separate at least a portion of the diluent from the polymer product. The separated diluent can be recycled for polymerizing the one or more $C_4$ to $C_7$ isoolefins.

17 Claims, 4 Drawing Sheets

SEPARATION OF POLYMER SLURRIES

BACKGROUND OF THE INVENTION

1. Field of the Invention

Embodiments of the present disclosure generally relate to the production of isoolefin polymers. More particularly, embodiments of the present disclosure relate to separating slurry components in the polymerization of $C_4$-$C_7$ isoolefins.

2. Description of the Related Art

Isoolefin polymers are typically prepared in a slurry polymerization process. Certain slurry processes use methyl chloride as the reaction diluent. Methyl chloride is used for a variety of reasons, including its ability to dissolve the monomers and catalyst but not the polymer product. Methyl chloride also has suitable freezing and boiling points to allow low temperature polymerization and effective separation from the polymer and unreacted monomers.

Following polymerization, the methyl chloride is separated from the polymer product. First, the cold rubber product slurry is heated to prevent plugging in the line between the reactor and the flash tank. In the flash tank, the liquid reaction medium is vaporized. See, for example, U.S. Pat. No. 2,542, 559 and RU 2 209 213. The vaporized reaction medium is then cooled and condensed back to a liquid, it is purified, and is recycled to the reactor at the reaction conditions. This is not an energy efficient process.

There are also a number of problems associated with polymerization in methyl chloride. For one, the polymer particles have a tendency to agglomerate with each other in the reactor and collect on the reactor wall, heat transfer surfaces, impeller(s), and agitator(s)/pump(s). The rate of agglomeration increases as reaction temperature rises. The subject of polymer accumulation has been addressed in several patents, such as U.S. Pat. Nos. 2,534,698, 2,548,415, and 2,644,809.

Hydrofluorocarbons (HFC's) have been proposed as alternative diluents. See, for example, WO 02/34794; WO 02/096964; WO 00/04061; U.S. Pat. Nos. 5,624,878; 5,527, 870; and 3,470,143. HFC's are environmentally friendly refrigerants because they have a very low (even zero) ozone depletion potential. However, the inefficiencies of the downstream diluent recovery remain the same.

There is a need, therefore, for alternative diluents or blends of diluents to create new polymerization systems that would reduce particle agglomeration in addition to an improved separation process that would improve productivity and efficiency.

SUMMARY OF THE INVENTION

Methods for producing elastomers or elastomeric compositions are provided. In at least one specific embodiment, one or more $C_4$ to $C_7$ isoolefins and one or more comonomers can be polymerized in the presence of a diluent comprising one or more hydrofluorocarbons to provide a slurry comprising polymer product, unreacted monomer and the diluent. The slurry can be extruded to separate at least a portion of the diluent from the polymer product. The separated diluent can be recycled for polymerizing the one or more $C_4$ to $C_7$ isoolefins.

In at least one other specific embodiment, one or more $C_4$ to $C_7$ isoolefins can be polymerized in the presence of a diluent comprising one or more hydrofluorocarbons in a reactor operated at slurry polymerization conditions. A reactor effluent can be recovered. The effluent can include polymer product, unreacted monomer and the diluent from the reactor. The reactor effluent can be extruded to separate at least a portion of the diluent and unreacted monomer from the polymer product, and the separated diluent and unreacted monomer can be recycled to the reactor.

In at least one other specific embodiment, the method includes polymerizing one or more $C_4$ to $C_7$ isoolefins in the presence of a diluent comprising one or more hydrofluorocarbons in a reactor operated at slurry polymerization conditions; recovering a reactor effluent comprising polymer product, unreacted monomer and the diluent from the reactor; extruding the reactor effluent to separate at least a portion of the diluent and unreacted monomer from the polymer product; adding heat to the reactor effluent to agglomerate the polymer; and recycling the separated diluent and unreacted monomer to the reactor.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" can in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Methods for producing elastomers or elastomeric compositions are provided. In one or more embodiments, one or more monomers are polymerized in the presence of a catalyst system and a diluent containing one or more hydrofluorocarbons (HFCs) or a blend of one or more HFCs with one or more hydrocarbons and/or one or more chlorinated hydrocarbons at slurry reaction conditions. The slurry containing polymer product, unreacted monomer and diluent can be extruded using one or more extrusion techniques to separate the polymer product from the unreacted monomer and diluent. The separated diluent and unreacted monomer can be recycled together or individually to the polymerization process. As used herein, the term "catalyst system" refers to one or more catalysts and/or one or more initiators.

In one or more embodiments, the process produces polymers of cationically polymerizable monomer(s) by contacting the one or more monomers with a catalyst system in the presence of a diluent containing HFC. All or part of the diluent can be one or more HFCs, or a blend of one or more HFCs and methyl chloride ("diluent blend").

We surprisingly discovered that when using an extruder to separate the fluid, e.g., diluent and unreacted monomers, from the polymer, the separation is improved by heating the slurry to above its instability temperature. The slurry instability temperature, as used in this disclosure, is the temperature above which the slurry is unstable, agglomerates into macroscopically large masses, and can no longer be suspended or re-suspended in the diluent or diluent blend. It is discovered by applicants of this disclosure that agglomerated masses of polymer can be conveyed in the extruder and separated from fluid, such as the diluent and unreacted monomers, in the extruder much more easily than the un-agglomerated slurry leaving the reaction process.

Figure 4:
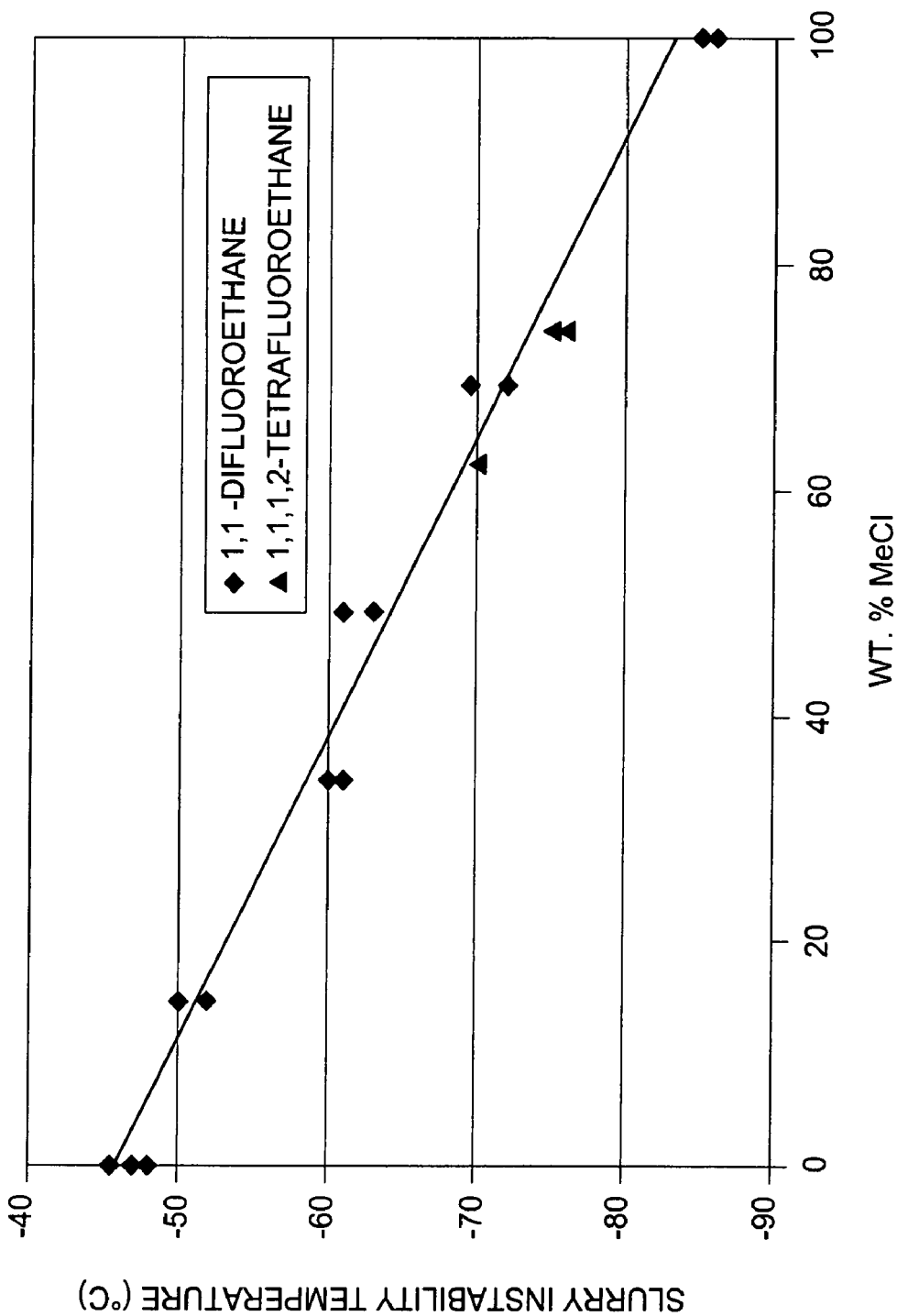
FIG. 4 depicts a graphical illustration of slurry instability temperature for butyl rubber slurries according to one or more embodiments described.

Furthermore, applicants of this disclosure discovered that the temperature at which the slurry becomes unstable depends on the composition of the diluent. As the ratio of HFC in the diluent to methyl chloride in the diluent increases, the slurry instability temperature increases as shown in FIG. 4. It is desirable to have some particle agglomeration to provide a slurry that is easier to extrude from the reactor to the solvent separation/recovery. In some preferred embodiments, the slurry from the reactor may be heated to above the slurry instability temperature for conveying and extrusion and separation of the fluid, e.g., diluent and unreacted monomers from the polymer.

Not wishing to be bound by theory, it is believed that the HFC in the polymer slurry also provides improved thermodynamics and related cost savings because the reaction process can be operated at temperatures warmer than pure methyl chloride systems but colder than the instability temperature.

In one or more embodiments, the slurry temperature of the polymerization process is maintained at least 1° C., 2° C., 3° C., 4° C., 5° C., 10° C., 15° C., 20° C. or 50° C. below the slurry instability temperature. In one or more embodiments, the slurry temperature in the polymerization reactor is 1° C. or more below the slurry instability temperature. In another embodiment, the slurry temperature in the polymerization reactor is maintained preferably 5° C. below the slurry instability temperature.

In one or more embodiments, the slurry temperature during extruder separation is maintained at least 1° C., 2° C., 3° C., 4° C., 5° C., 10° C., 15° C., 20° C. or 50° C. above the slurry instability temperature. In one or more embodiments, the slurry temperature during extruder separation is 1° C. or more above the slurry instability temperature. In another embodiment, the slurry temperature is maintained preferably 5° C. above the slurry instability temperature. In one or more embodiments, the slurry temperature during extruder separation is maintained no more than 25° C., 30° C., 35° C., 40° C., 45° C. or 50° C. above the slurry instability temperature. It is desirable to recycle the separated fluid, e.g., diluent and unreacted monomers, back to the cold polymerization process to effectively saving energy cost.

In one or more embodiments, the slurry instability temperature is at least −86° C. or more. In one or more embodiments, the slurry instability temperature is about −40° C. to about −84° C. In one or more embodiments, the slurry instability temperature is about −45° C. to about −76° C. In one or more embodiments, the slurry instability temperature ranges from a low of about −40° C., −50° C., or −55° C. to a high of about −60° C., −70° C. or −80° C.

Figure 1:
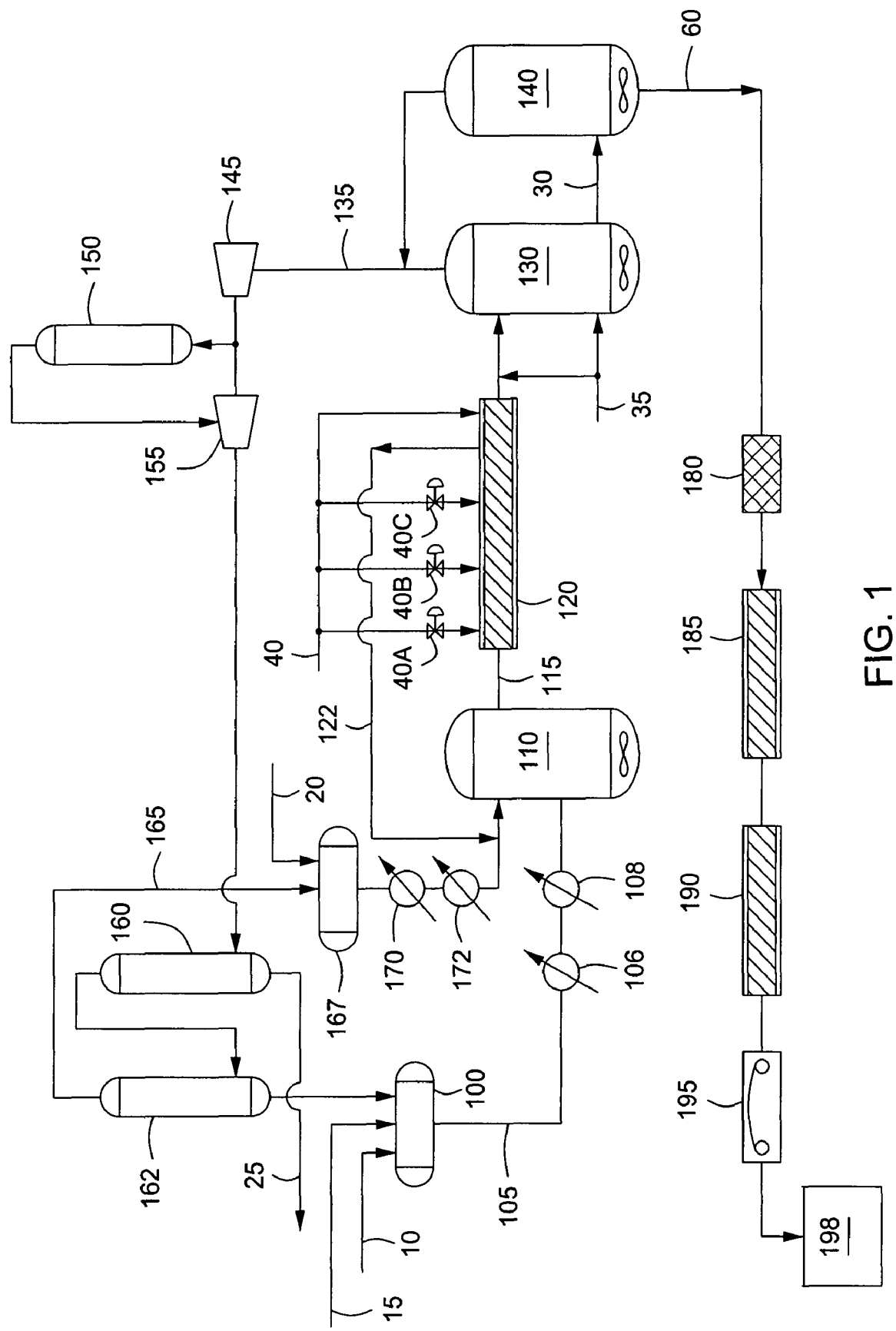
FIG. 1 depicts a simplified flow diagram for polymerizing butyl rubber and for separating components of the polymer slurry according to one or more embodiments described.

FIG. 1 depicts a simplified flow diagram for polymerizing butyl rubber and for separating components of the polymer slurry according to one or more embodiments described. A first feed stream 10 containing one or more isoolefin monomers and a second feed stream 15 containing one or more multi-olefin monomers can be blended with one or more diluents containing one or more HFCs within one or more mixing tanks 100. From the mixing tanks 100, a mixture stream 105 containing the one or more isoolefin monomers, multi-olefin monomers, and diluent(s) can be pre-chilled using one or more heat exchangers (two are shown) 106, 108 before being fed to one or more reactors 110. A feed stream 20 containing one or more catalysts and/or catalyst systems can be added and/or stored in one or more drums 167 before being fed to the one or more reactors 110. In one or more embodiments, the catalyst feed stream 20 can be pre-chilled using one or more heat exchangers (two are shown) 170, 172 before entering the reactor 110.

The reactor 110 can be any type, shape and/or configuration suitable to polymerize the monomers to produce rubber. In one or more embodiments, the reactor 110 can include a central, vertical draft tube surrounded by concentric rows of cooling tubes. The reactor can be mixed by an axial flow pump located at the bottom of the draft tube that circulates slurry through the cooling tubes. The reactor 110 can also include a jacket disposed thereabout for containing a heat transfer medium, such as ethylene. The ethylene is preferably fed to the jacket as a liquid. The liquid ethylene can absorb the heat of reaction and "boil" to maintain the desired polymerization temperature within the reactor tubes. Preferably, the polymerization temperature is kept below the slurry instability temperature for the diluent blend used. In one or more embodiments, the polymerization temperature may range from −100 C to about −50 C as long as the slurry within the reactor. Additional reactor details can be found in U.S. Pat. No. 5,417,930.

From the reactor 110, an effluent stream 115 containing at least a portion of the polymerization medium can be discharged to one or more conveying systems 120, such as an extruder, that are in fluid communication with one or more flash tanks 130. The reactor effluent stream 115 includes the polymerization medium which can include polymer product, unreacted monomer, catalyst, initiator, and/or diluent. The reactor effluent stream 115 can be insulated to keep the polymer therein at a temperature sufficient to prevent plugging.

In one or more embodiments, the concentration of the solids in the reactor effluent stream 115 is equal to or greater than 10 vol %. In one or more embodiments, the concentration of solids in the reactor effluent stream 115 is present in the reactor equal to or greater than 25 vol %. In one or more embodiments, the concentration of solids in the reactor effluent stream 115 ranges from 10 to 70 vol %. In one or more embodiments, the concentration of solids in the reactor effluent stream 115 ranges from 10 to 40 vol %. In one or more embodiments, the concentration of solids in the reactor effluent stream 115 ranges from 50 to 70 vol %. In one or more embodiments, the concentration of solids in the reactor effluent stream 115 ranges from 45 to 70 vol %. In one or more embodiments, the concentration of solids in the reactor effluent stream 115 ranges from 40 to 70 vol %.

The one or more flash tanks 130 can separate the reactor effluent stream 115 exiting the extruder 120 into a vapor stream 135 and a polymer stream 30. In one or more embodiments, the flash tank 130 contains a pool of hot water at a temperature ranging from 50° C. to about 75° C., and can be continuously heated by a flow of steam and/or hot water via stream 35. The hot water vaporizes the diluent and unreacted monomer while the butyl rubber forms a coarse slurry in the water.

The coarse rubber slurry can be passed to one or more stripper drums 140 via stream 30 to remove residual fluid from the rubber. The one or more stripper drums 140 can be operated at any suitable temperature and pressure to remove the residual fluid.

For example, stream 60 can be further separated from the water by screening on a de-watering screen 180, and then fed successively into a de-watering extruder 185 and drying extruder 190 where most of the remaining water can be removed. On leaving the drying extruder 190, the hot, compressed rubber can be exploded into a fluffy, porous crumb by steam created from the residual water, which has been heated under pressure. The crumb can be cooled and the remaining water can be allowed to evaporate using the conveyor 190. The dried crumb can then be compacted into bales, wrapped in polyethylene wrap and stacked for transport.

The fluid from the flash tank 130 and stripper drum 140 overheads (i.e. vapor stream 135) can be recycled. In one or more embodiments, the vapor stream 135 can be compressed via one or more compressors 145, 155, dried using one or more driers 150, and purified within towers 160, 162. The purified monomers can be added to the drum 100 and recycled to the reactor 110 when needed. In one or more embodiments, the diluent can be recovered in stream 165 and added to the drum 167 until recycled to the reactor 110 when needed.

Considering the one or more extruders 120 in more detail, the extruders 120 allow the separation of the volatile components (i.e. unreacted monomer and diluent) from the cold polymer slurry in the reactor effluent stream 115. The extruder 120 can also convey the polymer from the reactor to the flash tank and therefore reduce the tendency for plugging the reactor effluent line. As mentioned above, plugging can occur in the reactor effluent stream 115 if the slurry temperature rises above the slurry instability temperature. However, the reactor effluent stream 115 can be heated within the extruder to above the slurry instability temperature in order to agglomerate the polymer particles therein, providing a better slurry consistency for the extruder 120 to handle.

Any conventional extruder 120 can be used. For screw type extruders, any number of screws can be used. For example, the one or more extruders 120 each can have single or twin screws. Preferably, the extruder 120 is a self-cleaning, fully intermeshing co-rotating twin screw extruder. Illustrative extruders are commercially available from Werner-Pfleiderer, Berstoff, JSW, and Toshiba.

Figure 2:
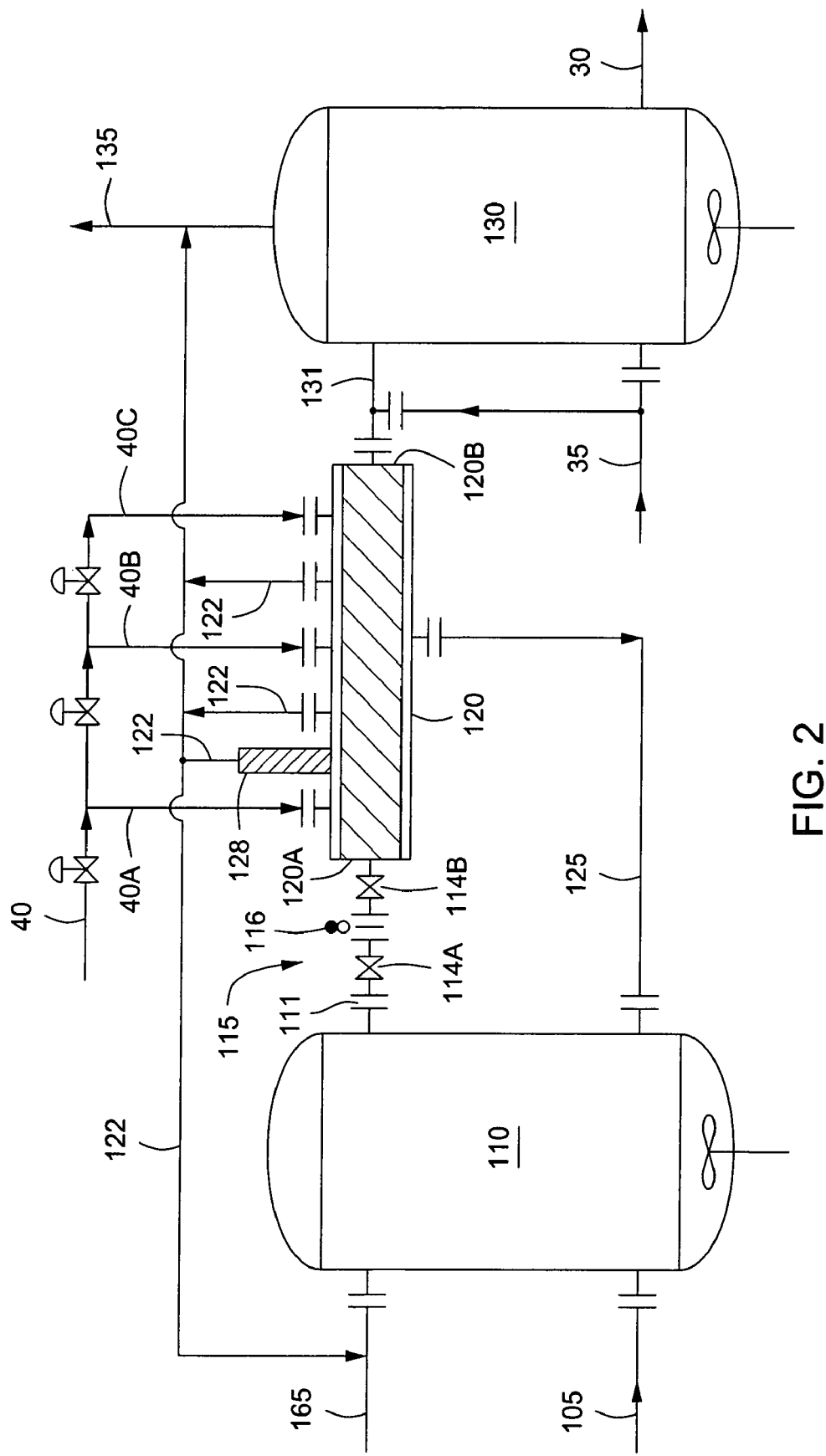
FIG. 2 depicts a partial, enlarged schematic view of an illustrative extruder configuration according to one or more embodiments described.

FIG. 2 depicts a partial, enlarged schematic view of an illustrative extruder configuration according to one or more embodiments described. In one or more embodiments, the one or more extruders 120 can be directly coupled to the reactor 110 at a first end 120A thereof. In one or more embodiments, the one or more extruders 120 can be directly coupled or otherwise attached to the reactor 110 at the first end 120A thereof and directly coupled or otherwise attached to the flash drum 130 at a second end 120B thereof. Accordingly, the reactor effluent stream 115 can exit the reactor 110 and can be directly conveyed through the extruder 120 and discharged to an inlet nozzle 131 of the flash drum 130. Although not shown, the extruder 120 can be directly mounted to the reactor 110 and/or the flash drum 130 via one or more bellow joints to accommodate thermal movement of the extruder 120.

In one or more embodiments, the first end 120A of the extruder 120 can be directly coupled or otherwise attached to an outlet nozzle 111 of the reactor 110. One or more block valves (two are shown) 114A, 114B can be disposed along the reactor effluent stream 115, between the reactor nozzle 111 and the first end 130A of the extruder 120. In one or more embodiments, a member for forming a fluid tight seal, such as a rotating blind 116 as depicted in FIG. 2, can be disposed between two block valves 114A, 114B. The rotating blind 116 can be used with the block valves 114A, 114B to block off the effluent stream 115 between the reactor 110 and the extruder 120. When blocked, the reactor 110 can be isolated from the extruder 120 so that cleaning or other maintenance operations can be performed without contaminating or otherwise disrupting the extruder 120. For example, the reactor 110 can be cleaned with one or more suitable solvents to remove unwanted rubber deposits without allowing the solvent(s) to enter the extruder 120 or the flash tank 130.

During operation, the extruder 120 is preferably maintained at a temperature above the slurry instability temperature to agglomerate the polymer particles. For example, the polymer slurry inside the extruder can have a temperature of from about −86° C. to about −40° C. depending on the composition of the diluent or diluent blend. In one or more embodiments, the polymer slurry has a temperature of from about −86° C. to about −50° C. In one or more embodiments, the polymer slurry has a temperature of from about −86° C. to about −60° C.

In one or more embodiments, the slurry within the extruder 120 is maintained at a temperature above the slurry instability temperature. As mentioned above, the slurry instability temperature is the temperature above which a slurry is unstable, agglomerates into macroscopically large masses and can no longer be suspended or re-suspended in the diluent or diluent blend. Preferably, the slurry temperature is maintained at least 1° C., 2° C., 3° C., 4° C., 5° C., or about 110° C. above the slurry instability temperature.

To control temperature within the extruder 120, one or more steam lines 40 can be arranged or otherwise located about the extruder 120. For example, the extruder 120 can have three or more steam lines 40A, 40B, 40C in fluid communication with the extruder 120. Each steam line 40A, 40B, 40C can be in fluid communication with one or more zones (not shown) of the extruder 120. The extruder 120 can have any number of zones, including one, two, three, four, five, six, seven, or eight zones, depending on the size and length of the extruder barrel.

In one or more embodiments, the extruder 120 can be built in sections, each section having one or more zones, to facilitate manufacture, and can be assembled into one unit. In one or more embodiments, the extruder 120 can include an intermeshing co-rotating pair of screws disposed within the barrel and a drive unit for rotating the screws (not shown). Each screw can include one or more channels and a set of flights. The set of flights can be pitched to permit displacement of the rubber slurry through the extruder 120 and can be spaced to permit expression of the slurry so that the high viscosity rubber phase is conveyed forward while the low viscosity liquid reaction medium can leak back through the screw channels. In one or more embodiments, the set of flights can include a first zone in which the flights are spaced apart to accommodate a relatively large volume of liquid reaction medium passing through the extruder 120. Farther along the extruder towards the second end 120B thereof, the set of flights can include a second zone in which the flights are spaced closer together. The change in flight pitch results in a pressure gradient, which results in separation of the liquid reaction medium. As such, the polymer and the reaction medium in the extruder 120 can be separated.

The two sets of flights intermesh so that the tip of one flight on one set of flights wipes against the face of the neighboring flight on the second set of flights. The drive unit can be used to synchronize the rotational movement of the screws. As the screws rotate, at a particular axial position, the wiping action alternates between the first and second sets of flights. The self-wiping action of the intermeshed co-rotating screws can prevent rubber from sticking to surfaces inside the extruder 120, thereby preventing plugging of the extruder. An illustrative extruder configuration and additional extruder details are described within US Publication No. 2005/0187366 A1.

In operation, rubber slurry can be discharged from the reactor 110 via the reactor effluent stream 115 and conveyed through the extruder 120. The fluid, e.g., diluent and unreacted monomers, within the extruder 120 can be separated within the extruder 120 and recycled to the reactor 110 via one or more streams 122 that are in fluid communication with one or more zones of the extruder 120. The fluid, e.g., diluent and unreacted monomers, can be volatilized or otherwise separated from the polymer slurry using mechanical energy from the extruder 120 or the thermal energy (i.e. heat) supplied to the extruder 120 via the one or more steam lines (three are shown 40A, 40B, 40C). The polymer and residual liquid reaction medium which continue through the extruder 120 eventually reaches the flash tank 130 and contacts hot water at the bottom of the flash tank 130 whereupon the diluent and residual monomers are vaporized. The vaporized diluent and monomer(s) can be drawn out of the flash tank 130 via the overhead stream 135.

In one or more embodiments, a second extruder 128, such as an intermeshing counter-rotating twin screw extruder, can be disposed approximate the first end 120A of the extruder 120, such as along a first zone thereof. An illustrative intermeshing counter-rotating twin screw extruder is the Mech Filt™ extruder from NFM/Welding Engineers Inc (Massillon, Ohio, USA). The counter-rotating twin screw extruder 128 can have narrow clearances between the screws and between the flights of the screws and the barrel so that low viscosity liquid can pass through, but not rubber. The rubber is thereby retained within extruder 120, and the separated liquid reaction medium can be discharged or recycled to the reactor 110 or the flash tank 130 via stream 122.

Figure 3:
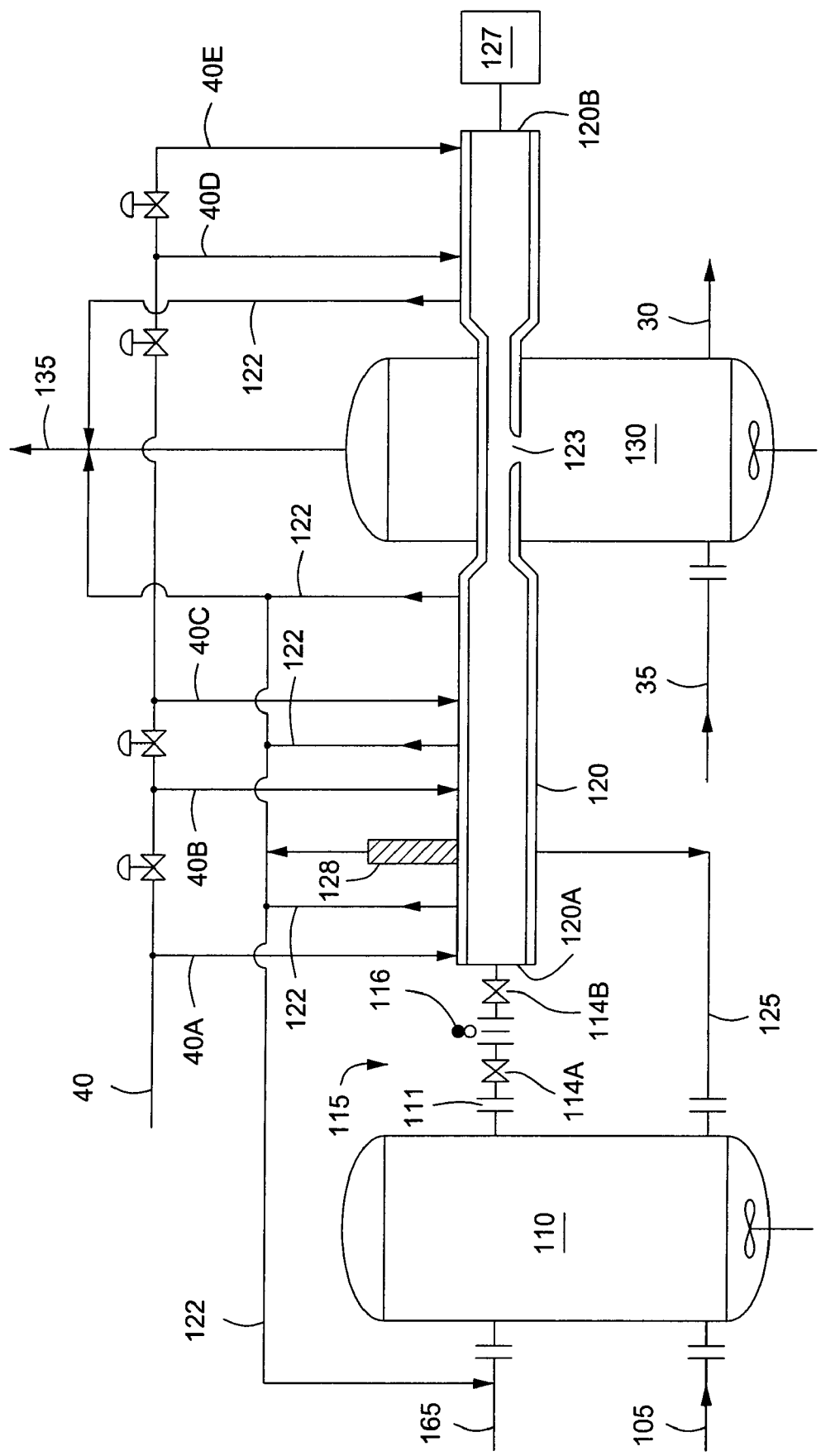
FIG. 3 depicts a partial, enlarged schematic view of another illustrative extruder configuration according to one or more embodiments described.

FIG. 3 depicts a partial, enlarged schematic view of another illustrative extruder configuration according to one or more embodiments described. As depicted, at least a portion of the extruder 120 can be disposed through the flash tank 130. As described above, the extruder 120 can include an intermeshing co-rotating pair of screws disposed within the barrel and a drive unit 127 for rotating the screws. The extruder 120 can also include an aperture 123 formed in the bottom of the barrel to allow the rubber slurry to drop directly into the pool of hot water within the flash tank 130. Preferably, the aperture 123 is located about the middle of the flash tank 130. To prevent rubber slurry from passing by the aperture 123, the screws can include a set of reverse flights (not shown) beyond the aperture 123. The reverse flights can be pitched to push rubber slurry back in the extruder 120 and out through the aperture 123.

Still referring to FIG. 3, the extruder 120 can have additional steam lines 40D, 40E in fluid communication therewith at the second end 120B of the extruder 120. As depicted, the second end 120B of the extruder 120 is located on an opposite side of the flash tank 130 relative to the first end 120A of the extruder 120. The steam lines 40D, 40E can provide temperature control to the second end 120B of the extruder 120 to prevent plugging therein. The second end 120B of the extruder 120 can also have one or more fluids outlet streams 122 in fluid communication therewith to help with the separation of the rubber slurry.

Monomers, Comonomers and Polymers

Suitable monomers and/or comonomers can include one or more olefins, alpha-olefins, disubstituted olefins, isoolefins, conjugated dienes, non-conjugated dienes, styrenics and/or substituted styrenics and vinyl ethers. The styrenics can be substituted (on the ring) with an alkyl, aryl, halide or alkoxide group. Preferably, the monomer or comonomer contains 2 to 20 carbon atoms, more preferably 2 to 9, even more preferably 3 to 9 carbon atoms. Examples of preferred olefins include styrene, para-alkylstyrene, para-methylstyrene, alpha-methyl styrene, divinylbenzene, diisopropenylbenzene, isobutylene, 2-methyl-1-butene, 3-methyl-1-butene, 2-methyl-2-pentene, isoprene, butadiene, 2,3-dimethyl-1,3-butadiene, [beta]-pinene, myrcene, 6,6-dimethyl-fulvene, hexadiene, cyclopentadiene, piperylene, methyl vinyl ether, ethyl vinyl ether, and isobutyl vinyl ether and the like.

Two or more monomers can also be used. For example, two or more monomers can be used to produce a block copolymer. Preferred block copolymers include copolymers of styrenics, such as styrene, para-methylstyrene, alpha-methylstyrene, and $C_4$ to $C_{30}$ diolefins, such as isoprene, butadiene, and the like. Particularly preferred monomer combinations include isobutylene and para-methyl styrene; and isobutylene and isoprene, as well as homopolymers of isobutylene.

The monomers can be present in the polymerization medium in an amount ranging from 75 wt % to 0.01 wt % in one embodiment, or 60 wt % to 0.1 wt %, or from 40 wt % to 0.2 wt %, or 30 to 0.5 wt %, or 20 wt % to 0.8 wt %, or and from 15 wt % to 1 wt % in one or more embodiments.

In one embodiment, butyl polymers can be prepared by reacting a comonomer mixture, the mixture having at least (1) a $C_4$ to $C_6$ isoolefin monomer component such as isobutene with (2) a multiolefin, or conjugated diene monomer component. The isoolefin can range from 70 to 99.5 wt % by weight of the total comonomer mixture or from 85 to 99.5 wt %. In yet another embodiment, the isoolefin can the range of 92 to 99.5 wt %. The conjugated diene component in one embodiment is present in the comonomer mixture from 30 to 0.5 wt % in one embodiment, and from 15 to 0.5 wt % in one embodiment. In yet another embodiment, from 8 to 0.5 wt % of the comonomer mixture is conjugated diene. The $C_4$ to $C_6$ isoolefin can be one or more of isobutene, 2-methyl-1-butene, 3-methyl-1-butene, 2-methyl-2-butene, and 4-methyl-1-pentene. The multiolefin can be a $C_4$ to $C_{14}$ conjugated diene such as isoprene, butadiene, 2,3-dimethyl-1,3-butadiene, [beta]-pinene, myrcene, 6,6-dimethyl-fulvene, hexadiene, cyclopentadiene and piperylene. One embodiment of the butyl rubber polymer is obtained by reacting 85 to 99.5 wt % of isobutylene with 15 to 0.5 wt % isoprene, or by reacting 95 to 99.5 wt % isobutylene with 5.0 wt % to 0.5 wt % isoprene in yet another embodiment.

Any combination of monomers can be used to produce terpolymers and tetrapolymers. Preferred terpolymers and tetrapolymers include polymers containing isobutylene, isoprene and divinylbenzene, polymers containing isobutylene, para-alkylstyrene (preferably paramethyl styrene) and isoprene, polymers containing cyclopentadiene, isobutylene, and paraalkyl styrene (preferably paramethyl styrene), polymers of isobutylene cyclopentadiene and isoprene, polymers containing cyclopentadiene, isobutylene, and methyl cyclopentadiene, polymers containing isobutylene, paramethylstyrene and cyclopentadiene.

Catalyst

The catalyst can include any Lewis acid based on metals from Group 4, 5, 13, 14 and 15 of the Periodic Table of the Elements, including boron, aluminum, gallium, indium, titanium, zirconium, tin, vanadium, arsenic, antimony, and bismuth. Illustrative catalysts include aluminum trichloride, aluminum tribromide, ethylaluminum dichloride, ethylaluminum sesquichloride, diethylaluminum chloride, methylaluminum dichloride, methylaluminum sesquichloride, dimethylaluminum chloride, boron trifluoride, titanium tetrachloride, etc. with ethylaluminum dichloride and ethylaluminum sesquichloride being preferred. Lewis acids such as methylaluminoxane (MAO) and specifically designed weakly coordinating Lewis acids such as $B(C_6F_5)_3$ can also be used. For more information regarding Lewis acids in polymerization processes, see, for example, International Application Nos. PCT/US03/40903 and PCT/US03/40340.

Initiator

Preferred initiators are capable of being complexed in a suitable diluent with the chosen Lewis acid to yield a complex which rapidly reacts with the olefin thereby forming a propagating polymer chain. Illustrative initiators include Bronsted acids such as $H_2O$, HCl, RCOOH (wherein R is an alkyl group), and alkyl halides, such as $(CH_3)_3CCl$, $C_6H_5C(CH_3)_2Cl$ and (2-chloro-2,4,4-trimethylpentane). Transition metal complexes, such as metal locenes and other such materials that can act as single site catalyst systems, such as when activated with weakly coordinating Lewis acids or Lewis acid salts can also be used.

In one or more embodiments, the initiator can include one or more of hydrogen halide, a carboxylic acid, a carboxylic acid halide, a sulfonic acid, an alcohol, a phenol, a tertiary alkyl halide, a tertiary aralkyl halide, a tertiary alkyl ester, a tertiary aralkyl ester, a tertiary alkyl ether, a tertiary aralkyl ether, alkyl halide, aryl halide, alkylaryl halide, and arylalkylacid halide.

As one skilled in the art will recognize the aforementioned listing of initiator(s) is not exhaustive and is provided for illustration. For a more information regarding initiator(s) in polymerization processes, see, for example, International Application Nos. PCT/US03/40903 and PCT/US03/40340.

Hydrofluorocarbons

The term "hydrofluorocarbons" (HFC's or HFC) as used herein refers to saturated or unsaturated compounds consisting essentially of hydrogen, carbon and fluorine, provided that at least one carbon, at least one hydrogen and at least one fluorine are present. In at least one specific embodiment, the one or more hydrofluorocarbons can be represented by the formula: $C_xH_yF_z$ wherein x is an integer from 1 to 40, or from 1 to 30, or from 1 to 20, or from 1 to 10, or from 1 to 6, or from 2 to 20 or from 3 to 10, or from 3 to 6, most preferably from 1 to 3, wherein y and z are integers and at least one.

Illustrative hydrofluorocarbons can include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,3,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; -1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2-methylpropane; 1,1,3,3,-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane; and mixtures thereof and including mixtures of unsaturated HFC's described below. Particularly preferred HFC's include difluoromethane, trifluoromethane, 1,1-difluoroethane, 1,1,1-trifluoroethane, fluoromethane, and 1,1,1,2-tetrafluoroethane.

Illustrative unsaturated hydrofluorocarbons include vinyl fluoride; 1,1-difluoroethene; 1,2-difluoroethene; 1,1,2-trifluoroethene; 1-fluoropropene, 1,1-difluoropropene; 1,2-difluoropropene; 1,3-difluoropropene; 2,3-difluoropropene; 3,3-difluoropropene; 1,1,2-trifluoropropene; 1,1,3-trifluoropropene; 1,2,3-trifluoropropene; 1,3,3-trifluoropropene; 2,3,3-trifluoropropene; 3,3,3-trifluoropropene; 1-fluoro-1-butene; 2-fluoro-1-butene; 3-fluoro-1-butene; 4-fluoro-1-butene; 1,1-difluoro-1-butene; 1,2-difluoro-1-butene; 1,3-difluoropropene; 1,4-difluoro-1-butene; 2,3-difluoro-1- butene; 2,4-difluoro-1-butene; 3,3-difluoro-1-butene; 3,4-difluoro-1-butene; 4,4-difluoro-1-butene; 1,1,2-trifluoro-1-butene; 1,1,3-trifluoro-1-butene; 1,1,4-trifluoro-1-butene; 1,2,3-trifluoro-1-butene; 1,2,4-trifluoro-1-butene; 1,3,3-trifluoro-1-butene; 1,3,4-trifluoro-1-butene; 1,4,4-trifluoro-1-butene; 2,3,3-trifluoro-1-butene; 2,3,4-trifluoro-1-butene; 2,4,4-trifluoro-1-butene; 3,3,4-trifluoro-1-butene; 3,4,4-trifluoro-1-butene; 4,4,4-trifluoro-1-butene; 1,1,2,3-tetrafluoro-1-butene; 1,1,2,4-tetrafluoro-1-butene; 1,1,3,3-tetrafluoro-1-butene; 1,1,3,4-tetrafluoro-1-butene; 1,1,4,4-tetrafluoro-1-butene/1,2,3,3-tetrafluoro-1-butene; 1,2,3,4-tetrafluoro-1-butene; 1,2,4,4-tetrafluoro-1-butene; 1,3,3,4-tetrafluoro-1-butene; 1,3,4,4-tetrafluoro-1-butene; 1,4,4,4-tetrafluoro-1-butene; 2,3,3,4-tetrafluoro-1-butene; 2,3,4,4-tetrafluoro-1-butene; 2,4,4,4-tetrafluoro-1-butene; 3,3,4,4-tetrafluoro-1-butene; 3,4,4,4-tetrafluoro-1-butene; 1,1,2,3,3-pentafluoro-1-butene; 1,1,2,3,4-pentafluoro-1-butene; 1,1,2,4,4-pentafluoro-1-butene; 1,1,3,3,4-pentafluoro-1-butene; 1,1,3,4,4-pentafluoro-1-butene; 1,1,4,4,4-pentafluoro-1-butene; 1,2,3,3,4-pentafluoro-1-butene; 1,2,3,4,4-pentafluoro-1-butene; 1,2,4,4,4-pentafluoro-1-butene; 2,3,3,4,4-pentafluoro-1-butene; 2,3,4,4,4-pentafluoro-1-butene; 3,3,4,4,4-pentafluoro-1-butene; 1,1,2,3,3,4-hexafluoro-1-butene; 1,1,2,3,4,4-hexafluoro-1-butene; 1,1,2,4,4,4-hexafluoro-1-butene; 1,2,3,3,4,4-hexafluoro-1-butene; 1,2,3,4,4,4-hexafluoro-1-butene; 2,3,3,4,4,4-hexafluoro-1-butene; 1,1,2,3,3,4,4-heptafluoro-1-butene; 1,1,2,3,4,4,4-heptafluoro-1-butene; 1,1,3,3,4,4,4-heptafluoro-1-butene; 1,2,3,3,4,4,4-heptafluoro-1-butene; 1-fluoro-2-butene; 2-fluoro-2-butene; 1,1-difluoro-2-butene; 1,2-difluoro-2-butene; 1,3-difluoro-2-butene; 1,4-difluoro-2-butene; 2,3-difluro-2-butene; 1,1,1-trifluoro-2-butene; 1,1,2-trifluoro-2-butene; 1,1,3-trifluoro-2-butene; 1,1,4-trifluoro-2-butene; 1,2,3-trifluoro-2-butene; 1,2,4-trifluoro-2-butene; 1,1,1,2-tetrafluoro-2-butene; 1,1,1,3-tetrafluoro-2-butene; 1,1,1,4-tetrafluoro-2-butene; 1,1,2,3-tetrafluoro-2-butene; 1,1,2,4-tetrafluoro-2-butene; 1,2,3,4-tetrafluoro-2-butene; 1,1,1,2,3-pentafluoro-2-butene; 1,1,1,2,4-pentafluoro-2-butene; 1,1,1,3,4-pentafluoro-2-butene; 1,1,1,4,4-pentafluoro-2-butene; 1,1,2,3,4-pentafluoro-2-butene; 1,1,2,4,4-pentafluoro-2-butene; 1,1,1,2,3,4-hexafluoro-2-butene; 1,1,1,2,4,4-hexafluoro-2-butene; 1,1,1,3,4,4-hexafluoro-2-butene; 1,1,1,4,4,4-hexafluoro-2-butene; 1,1,2,3,4,4-hexafluoro-2-butene; 1,1,1,2,3,4,4-heptafluoro-2-butene; 1,1,1,2,4,4,4-heptafluoro-2-butene; and mixtures thereof and including mixtures of saturated HFC's described above.

In one or more embodiments, the diluent is or includes non-perfluorinated compounds. Perfluorinated compounds include those compounds consisting of carbon and fluorine. However, in one or more embodiments, when the diluent is a blend, the blend can include perfluorinated compounds, preferably, the catalyst, monomer, and diluent are present in a single phase or the aforementioned components are miscible with the diluent as described in further detail below.

In one or more embodiments, one or more HFC's can be used in combination with another diluent or mixtures of diluents. Illustrative diluents include hydrocarbons, especially hexanes and heptanes, halogenated hydrocarbons, especially chlorinated hydrocarbons and the like. Specific examples include but are not limited to propane, isobutane, pentane, methylcyclopentane, isohexane, 2-methylpentane, 3-methylpentane, 2-methylbutane, 2,2-dimethylbutane, 2,3-dimethylbutane, 2-methylhexane, 3-methylhexane, 3-ethylpentane, 2,2-dimethylpentane, 2,3-dimethylpentane, 2,4-dimethylpentane, 3,3-dimethyl pentane, 2-methylheptane, 3-ethylhexane, 2,5-dimethylhexane, 2,24,-trimethylpentane, octane, heptane, butane, ethane, methane, nonane, decane, dodecane, undecane, hexane, methyl cyclohexane, cyclopropane, cyclobutane, cyclopentane, methylcyclopentane, 1,1-dimethylcycopentane, cis 1,2-dimethylcyclopentane, trans-1,2-dimethylcyclopentane, trans-1,3-dimethylcyclopentane, ethylcyclopentane, cyclohexane, methylcyclohexane, benzene, toluene, xylene, ortho-xylene, para-xylene, meta-xylene, and the halogenated versions of all of the above, preferably the chlorinated versions of the above, more preferably fluorinated versions of all of the above. Brominated versions of the above are also useful. Specific examples include, methyl chloride, methylene chloride, ethyl chloride, propyl chloride, butyl chloride, chloroform and the like.

In one or more embodiments, non-reactive olefins can be used as diluents in combination with HFC's. Examples include, but are not limited to, ethylene, propylene, and the like.

In at least one specific embodiment, the HFC can be used with a chlorinated hydrocarbon such as methyl chloride. Additional embodiments include using the HFC in combination with hexanes or methyl chloride and hexanes. In one or more embodiments, the HFC's can be used in combination with one or more gases inert to the polymerization such as carbon dioxide, nitrogen, hydrogen, argon, neon, helium, krypton, zenon, and/or other inert gases that are preferably liquid at entry to the reactor. Preferred gases include carbon dioxide and/or nitrogen.

In one or more embodiments, the HFC's can be used in combination with one or more nitrated alkanes, including C1 to C40 nitrated linear, cyclic or branched alkanes. Illustrative nitrated alkanes include, but are not limited to, nitromethane, nitroethane, nitropropane, nitrobutane, nitropentane, nitrohexane, nitroheptane, nitrooctane, nitrodecane, nitrononane, nitrododecane, nitroundecane, nitrocyclomethane, nitrocycloethane, nitrocyclopropane, nitrocyclobutane, nitrocyclopentane, nitrocyclohexane, nitrocycloheptane, nitrocyclooctane, nitrocyclodecane, nitrocyclononane, nitrocyclododecane, nitrocycloundecane, nitrobenzene, and the di- and tri-nitro versions of the above. A preferred embodiment is HFC's blended with nitromethane.

The HFC can be present at 1 to 100 volume % based upon the total volume of the diluents, or between 5 and 100 volume %, or between 10 and 100 volume %, or between 15 and 100 volume %, or between 20 and 100 volume %, or between 25 and 100 volume %, or between 30 and 100 volume %, or between 35 and 100 volume %, or between 40 and 100 volume %, or between 45 and 100 volume %, or between 50 and 100 volume %, or between 55 and 100 volume %, or between 60 and 100 volume %, or between 65 and 100 volume %, or between 70 and 100 volume %, or between 75 and 100 volume %, or between 80 and 100 volume %, or between 85 and 100 volume %, or between 90 and 100 volume %, or between 95 and 100 volume %, or between 97 and 100 volume %, or between 98 and 100 volume %, and or between 99 and 100 volume %. In one or more embodiments, the HFC can be blended with one or more chlorinated hydrocarbons. In one or more embodiments, the HFC can be selected from the group consisting of difluoromethane, trifluoromethane, 1,1-difluoroethane, 1,1,1-trifluoroethane, and 1,1,1,2-tetrafluoroethane and mixtures thereof.

In one or more embodiments, the diluent or diluent mixture can be selected based upon its solubility in the polymer. Certain diluents are soluble in the polymer. Preferred diluents have little to no solubility in the polymer. Solubility in the polymer is measured by forming the polymer into a film of thickness between 50 and 100 microns, then soaking it in diluent (enough to cover the film) for 4 hours at −75° C. The film is removed from the diluent, exposed to room temperature for 90 seconds to evaporate excess diluent from the surface of the film, and weighed. The mass uptake is defined as the percentage increase in the film weight after soaking. The diluent or diluent mixture is chosen so that the polymer has a mass uptake of less than 4 wt %, preferably less than 3 wt %, preferably less than 2 wt %, preferably less than 1 wt %, more preferably less than 0.5 wt %.

In one or more embodiments, the diluent or diluent mixture can be selected such that the difference between the measured glass transition temperature (Tg) of the polymer with less than 0.1 wt % of any diluent, unreacted monomers and additives is within 15° C. of the Tg of the polymer measured after it has been formed into a film of thickness between 50 and 100 microns, that has been soaked in diluent (enough to cover the film) for 4 hours at −75° C. The glass transition temperature is determined by differential scanning calorimetry (DSC). Techniques are well described in the literature, for example, B. Wunderlich, "The Nature of the Glass Transition and its Determination by Thermal Analysis", in Assignment of the Glass Transition, ASTM STP 1249, R. J. Seyler, Ed., American Society for Testing and Materials, Philadelphia, 1994, pp. 17-31. The sample is prepared as described above, sealed immediately after soaking into a DSC sample pan, and maintained at a temperature below −80 C until immediately before the DSC measurement. Preferably the Tg values are within 12° C. of each other, preferably within 11° C. of each other, preferably within 10° C. of each other, preferably within 9° C. of each other, preferably within 8° C. of each other, preferably within 7° C. of each other, preferably within 6° C. of each other, preferably within 5° C. of each other, preferably within 4° C. of each other, preferably within 3° C. of each other, preferably within 2° C. of each other, or preferably within 1° C. of each other.

Applications

The polymers described provide chemical and physical characteristics that make them highly useful in a variety of applications. For example, the polymers can be used as adhesives, caulks, sealants, and glazing compounds. The polymers are also useful as plasticizers in rubber formulations with butyl, SBR, and natural rubber. The polymers are also widely employed in lubricants as dispersants and in potting and electrical cable filling materials. In certain applications, the polymers can be used in chewing-gum, as well as in medical applications such as pharmaceutical stoppers, and the arts for paint rollers. Further, the polymers are especially useful for tires, bladders, inner tubes, inner liners, tire sidewalls, tread compounds, high temperature service hoses, and conveyor belts for hot material handling. The polymers can also be used for air cushions, pneumatic springs, air bellows, accumulator bags, pharmaceutical closures. Further, the polymers are useful in molded rubber parts and find wide applications in automobile suspension bumpers, auto exhaust hangers, and body mounts.

The polymers described can also be blended with one or more other polymers. For example, the polymers described can be blended with one or more thermoplastic resins including high-density polyethylene and isotactic polypropylene to increase strength of the polyolefin. The polymers described can also be blended with polyamides to produce other industrial applications.

Referring again to FIG. 1, fresh monomer feeds (i.e. isobutylene and isoprene) via streams 10, 15 are combined in the storage drum 100 together with recycled materials from the tower 162. The storage drum 100 operates at close to ambient temperature. The mixed feed steam 105 is transported from the storage drum 100 to the feed coolers 106, 108 where the mixed feed is cooled to below about −90° C. Fresh catalyst feed via stream 20 is added to the drum 167 along with recycled materials from tower 162 via stream 164. That mixed stream 164 exits the storage drum 167, cooled within coolers 170, 172, and fed to the reactor 110. Within reactor 305, polymerization takes place at a temperature normally maintained in a range from about −90° C. to about −98° C. by a cooling system utilizing the evaporation of liquid ethylene.

Rubber slurry produced during polymerization exits the reactor 110 as reactor effluent stream 115. The rubber slurry from stream 115 enters the extruder 120 and is conveyed to the flash tank 130. Within the extruder 120, the rubber phase of the rubber slurry is separated by expression from the liquid reaction medium. The separated liquid (i.e. HFC/methyl chloride diluent blend and unreacted isobutylene and isoprene monomer) can be directly recycled to the reactor 110 via stream 122 or sent for further separation and processing via stream 135. The separated liquids (i.e. cold diluent) can be recycled to the reactor 110 via recycle stream 125. Recycling the cold liquid reaction medium via stream 125 results in less energy consumed to cool the monomer feed (i.e. stream 105) to the reactor 110.

The at least partially separated rubber slurry can be further separated within the flash tank 130. Within the flash tank 130, residual diluent and monomers are flashed from the rubber by hot water at a temperature of about 50° C. to 75° C. Diluent and monomer vapors are transported through stream 135 and subjected to a number of processing steps, including compression, drying, purifying, and/or condensing, leaving the bulk as a purified liquid that is recycled through streams 163 and/or 164 into the drums 100 or 167 where it is mixed with the fresh feeds.

From the flash tank 130, the non-volatile components (e.g. oligomers and polymer components) can be transported as a rubber slurry to the stripper drum 140 to remove residual fluid. The stripper drum 140 contains a bath or pool of steam and/or water at a temperature of about 40° C. to about 70° C. depending on the operating pressure of the stripper. The stripped fluid, e.g., diluent and unreacted monomers, are removed via stream 135 exiting the overhead of the stripper drum 140. The purified rubber exits the stripper drum 140 as a water slurry via stream 60. Stream 60 can be sent directly to finishing as described above.

EXAMPLES

The foregoing discussion can be further described with reference to the following non-limiting examples. Sixteen examples (Examples 1-16) of butyl rubber were prepared in a slurry containing HFC or a blend of HFC and methyl chloride A comparative example of butyl rubber prepared in a slurry containing only methyl chloride as the diluent (Comp. Ex. 1) is also provided. The slurry instability temperatures of the slurries are reported in Table 1 and FIG. 4, as explained below.

For each example, the polymerizations were conducted in stainless steel resin kettles, equipped with a Teflon turbine impeller on a glass stir shaft driven by an external electrically driven stirrer. The reactor was cooled to the desired reaction temperature by immersing the assembled reactor into a pentane or isohexane bath in an inert atmosphere glove box. The temperature of the stirred hydrocarbon bath was controlled to ±2° C. All apparatus in liquid contact with the reaction medium were dried at 120° C. and cooled in a nitrogen atmosphere before use. Isobutylene (Matheson or ExxonMobil) and methyl chloride (Air Products) were dried by passing the gas through three stainless steel columns containing barium oxide and were condensed and collected as liquids in the dry box. Both materials were condensed and collected as liquids in the dry box. Isoprene (Aldrich) was used as received. The HCl (Aldrich, 99% pure) stock solution was prepared by dissolving a desirable amount of HCl gas in dry MeCl or HFC to achieve 2-3% concentration by weight. The exact concentration of the HCl in this solution was determined by titration with an aqueous NaOH solution of known concentration by methods known to those skilled in the art. The hydrofluorocarbons (1,1,1,2-tetrafluoroethane from National Refrigerants and 1,1-difluoroethane from Technical Propellants) were collected as clear, colorless liquids and were used as received. Ethyl aluminum dichloride (Aldrich) was used as a 1.0 mol/L hydrocarbon solution. These solutions were either purchased or prepared from the neat ethyl aluminum dichloride.

Monomer feed was prepared in a stainless steel resin kettle at the desired starting temperature using 105 ml of 1,1-difluoroethane, 245 ml of methyl chloride, 111 ml of isobutylene and 2.8 ml of isoprene. Separately a catalyst solution was prepared from 45 ml of 1,1-difluoroethane, 105 ml of methyl chloride, 0.568 ml of a 0.57 mol/L solution of HCl in methyl chloride and 0.999 ml of a 1.0 mol/L solution of ethylaluminum dichloride in hexane.

The slurry copolymerizations were performed by dissolving monomer and comonomer into the liquefied diluent or diluent blend at polymerization temperature and stirred at a pre-determined stirring speed between 800 to 1000 rpm. A processor controlled electric stirring motor allowed control of the stirring speed to within 5 rpm. The initiator/coinitiator solutions were prepared in the diluent or diluent blend used for the experiment. The initiator/coinitiator solutions were prepared by dissolving the initiator into the diluent or diluent blend and adding, with mixing, a 1.0 M solution of ethylaluminum dichloride. The initiator/coinitiator solution was used immediately.

The diluents used were MeCl (methyl chloride), 1,1-difluoroethane, and 1,1,1,2-tetrafluoroethane. Table 1 summarizes the diluent or diluent blends used in addition to the measured instability temperatures. Those examples which contain between zero and 100% methyl chloride are diluent blends.

The slurry instability temperature was then measured. A preliminary experiment in the appropriate diluent or diluent blend was conducted to approximate the instability temperature in order to better select an appropriate starting temperature for the polymerization that generated the data presented in Table 1. The temperature of the polymerization was initially controlled to maintain reactor temperature to within approximately two degrees of the initial reactor temperature. This interval permitted the development of a stable rubber slurry and an increase in the concentration of the rubber in the reactor. After a stable slurry was achieved, catalyst addition was continued, but without the benefit of external cooling. As a result, the temperature of the slurry would slowly rise until the slurry no longer was stable and yielded to mass agglomeration. The temperature at which the slurry was no longer stable was recorded as the slurry instability temperature. The polymerization was begun at a temperature that was approximately five to eight degrees below the recorded instability temperature. FIG. 4 shows a graphical illustration of the slurry instability temperatures shown in Table 1.

TABLE 1

| Example | HFC | Wt. % MeCl | Instability T (° C.) |
| --- | --- | --- | --- |
| 1 | 1,1-difluoroethane | 0 | −47 |
| 2 | 1,1-difluoroethane | 0 | −45.5 |
| 3 | 1,1-difluoroethane | 0 | −48 |
| 4 | 1,1-difluoroethane | 14.6 | −52 |
| 5 | 1,1-difluoroethane | 14.6 | −50 |
| 6 | 1,1-difluoroethane | 34.3 | −60 |
| 7 | 1,1-difluoroethane | 34.3 | −61 |
| 8 | 1,1-difluoroethane | 49.2 | −63 |
| 9 | 1,1-difluoroethane | 49.2 | −61 |
| 10 | 1,1-difluoroethane | 49.2 | −63 |
| 11 | 1,1-difluoroethane | 49.2 | −61 |
| 12 | 1,1-difluoroethane | 69.3 | −72 |
| 13 | 1,1-difluoroethane | 69.3 | −69.5 |
| 14 | 1,1,1,2-tetrafluoroethane | 74.1 | −75 |
| 15 | 1,1,1,2-tetrafluoroethane | 74.1 | −76 |
| 16 | 1,1,1,2-tetrafluoroethane | 62.5 | −70 |
| Comp. 1 | None | 100 | −86 |
| Comp. 1 | None | 100 | −85 |

As shown in Table 1, the instability temperature of the HFC slurry and HFC slurry blends (Examples 1-16) ranged from −47° C. to −75° C. The methyl chloride slurry (Comp. Example 1) had an instability temperature of about −85° C. or −86° C. The HFC containing slurries had warmer instability temperatures than the methyl chloride slurry. Such warmer instability temperatures provide a wider operating window, operating flexibility of the extruder, energy cost savings, and environmental friendly operation, which are not obtainable from pure methyl chloride slurries.

Embodiments of the disclosure further relate to:

1. A method for producing elastomers or elastomeric compositions, comprising:
    polymerizing one or more $C_4$ to $C_7$ isoolefins and one or more comonomers in the presence of a diluent comprising one or more hydrofluorocarbons to provide a slurry comprising polymer product, unreacted monomer and the diluent;
    extruding the slurry to separate at least a portion of the diluent from the polymer product; and
    recycling the separated diluent for polymerizing the one or more $C_4$ to $C_7$ isoolefins.
2. The method of paragraph 1, wherein the polymer product is selected from the group consisting of poly(isobutylene-co-alkylstyrene), star-branched butyl rubber, butyl rubber, and mixtures thereof.
3. The method of paragraphs 1 or 2, wherein the polymer product comprises star branched butyl rubber.
4. The method of any of paragraphs 1 to 3, wherein the elastomers or elastomeric compositions comprise at least one of poly(isobutylene-co-alkylstyrene), halogenated poly(isobutylene-co-alkylstyrene), star-branched butyl rubber, halogenated star-branched butyl rubber, butyl rubber, halogenated butyl rubber, and mixtures thereof.
5. The method of any of paragraphs 1 to 4, wherein the diluent comprises at least 10% by weight of the one or more hydrofluorocarbons.
6. The method of any of paragraphs 1 to 5, further comprising heating the slurry to a temperature ranging from 1° C. above to about 50° C. above the instability temperature of the slurry prior to extruding the slurry.
7. The method of any of paragraphs 1 to 6, wherein the diluent comprises 1,1-difluoroethane, 1,1,1,2-tetrafluoroethane, or both.
8. The method of any of paragraphs 1 to 7, wherein the diluent further comprises methyl chloride.
9. A method for producing elastomers or elastomeric compositions, comprising:
    polymerizing one or more $C_4$ to $C_7$ isoolefins and one or more comonomers in the presence of a diluent comprising one or more hydrofluorocarbons in a reactor operated at slurry polymerization conditions;
    recovering a reactor effluent comprising polymer product, unreacted monomer and the diluent from the reactor;
    extruding the reactor effluent to separate at least a portion of the diluent and unreacted monomer from the polymer product; and
    recycling the separated diluent and unreacted monomer to the reactor.

10. The method of paragraph 9, wherein an extruder for extruding the reactor effluent is directly coupled to the reactor.
11. The method of paragraphs 9 or 10, wherein an extruder for extruding the reactor effluent is directly coupled to a section of heated piping that is directly coupled to the reactor.
12. The method of any of paragraphs 9 to 11, wherein the polymer product is selected from the group consisting of poly(isobutylene-co-alkylstyrene), star-branched butyl rubber, butyl rubber, and mixtures thereof.
13. The method of any of paragraphs 9 to 12, wherein the polymer product comprises star branched butyl rubber.
14. The method of any of paragraphs 9 to 13, wherein the elastomers or elastomeric compositions comprise at least one of poly(isobutylene-co-alkylstyrene), halogenated poly(isobutylene-co-alkylstyrene), star-branched butyl rubber, halogenated star-branched butyl rubber, butyl rubber, halogenated butyl rubber, and mixtures thereof.
15. The method of any of paragraphs 9 to 14, wherein the diluent comprises at least 10% by weight of the one or more hydrofluorocarbons.
16. The method of any of paragraphs 9 to 15, wherein the diluent further comprises methyl chloride.
17. The method of any of paragraphs 9 to 16, wherein the diluent comprises 1,1-difluoroethane, 1,1,1,2-tetrafluoroethane, or both.
18. The method of any of paragraphs 9 to 17, further comprising heating the slurry to a temperature ranging from 1° C. above to about 50° C. above the instability temperature of the slurry prior to extruding the slurry.
19. A method for producing elastomers or elastomeric compositions, comprising:
  polymerizing one or more $C_4$ to $C_7$ isoolefins and one or more comonomers in the presence of a diluent comprising one or more hydrofluorocarbons in a reactor operated at slurry polymerization conditions;
  recovering a reactor effluent comprising polymer product, unreacted monomer and the diluent from the reactor;
  extruding the reactor effluent to separate at least a portion of the diluent and unreacted monomer from the polymer product;
  adding heat to the reactor effluent to agglomerate the polymer; and
  recycling the separated diluent and unreacted monomer to the reactor.
20. The method of paragraph 19, wherein the heat is added to the reactor effluent while the reactor effluent is extruded.
21. The method of paragraphs 19 or 20, wherein an extruder for extruding the reactor effluent is directly coupled to the reactor.
22. The method of any of paragraphs 19 to 21, wherein an extruder for extruding the reactor effluent is directly coupled to a section of heated piping that is directly coupled to the reactor.
23. The method of any of paragraphs 19 to 22, wherein the heat is added to one or more zones of the extruder.
24. The method of any of paragraphs 19 to 23, wherein separated diluent is recycled from the extruder to the reactor.
25. The method of any of paragraphs 19 to 24, wherein the polymer product is selected from the group consisting of poly(isobutylene-co-alkylstyrene), star-branched butyl rubber, butyl rubber, and mixtures thereof.
26. The method of any of paragraphs 19 to 25, wherein the heat is added so that the slurry is maintained at a temperature ranging from 1° C. above to about 50° C. below the instability temperature of the slurry prior to extruding the slurry.
27. The method of any of paragraphs 19 to 26, wherein the elastomers or elastomeric compositions comprise at least one of poly(isobutylene-co-alkylstyrene), halogenated poly(isobutylene-co-alkylstyrene), star-branched butyl rubber, halogenated star-branched butyl rubber, butyl rubber, halogenated butyl rubber, and mixtures thereof.
28. The method of any of paragraphs 19 to 27, wherein the diluent comprises at least 10% by weight of the one or more hydrofluorocarbons.
29. The method of any of paragraphs 19 to 28, wherein the diluent comprises 1,1-difluoroethane, 1,1,1,2-tetrafluoroethane, or both.
30. The method of any of paragraphs 19 to 29, wherein the diluent further comprises methyl chloride.
31. The method of any of paragraphs 1 to 30, wherein the slurry has a slurry instability temperature of at least about −86° C.
32. The method of any of paragraphs 1 to 31, wherein the slurry has a slurry instability temperature of about −40° C. to about −84° C.
33. The method of any of paragraphs 1 to 32, wherein the slurry has a slurry instability temperature of about −45° C. to about −76° C.
34. A system for producing elastomers or elastomeric compositions, comprising:
  a vessel having a means for agitation disposed therein;
  an extruder directly coupled, at a first end thereof, to at least one nozzle disposed on an upper portion of the vessel;
  a first conduit for containing or flowing a vapor, the first conduit in communication with the extruder; and
  a second conduit for containing or flowing a liquid, the second conduit in communication with the extruder at a first end thereof and the vessel at a second end thereof.
35. The system of paragraph 34, further comprising means for isolating the vessel from the extruder.
36. The system of paragraph 34 or 35, further comprising means for controlling thermal energy addition to the extruder.
37. An elastomeric composition produced from a process comprising:
  polymerizing one or more $C_4$ to $C_7$ isoolefins and one or more comonomers in the presence of a diluent comprising one or more hydrofluorocarbons to provide a slurry comprising the elastomeric composition, unreacted monomer and the diluent;
  extruding the slurry to separate at least a portion of the diluent from the elastomeric composition; and
  recycling the separated diluent for polymerizing the one or more $C_4$ to $C_7$ isoolefins.
38. The composition of paragraph 37, wherein the elastomeric composition is selected from the group consisting of poly(isobutylene-co-alkylstyrene), star-branched butyl rubber, butyl rubber, and mixtures thereof.
39. The composition of paragraph 37 or 38, wherein the elastomeric composition comprises star branched butyl rubber.
40. The composition of any of paragraphs 37 to 39, wherein the elastomers or elastomeric compositions comprise at least one of poly(isobutylene-co-alkylstyrene), halogenated poly(isobutylene-co-alkylstyrene), star-branched butyl rubber, halogenated star-branched butyl rubber, butyl rubber, halogenated butyl rubber, and mixtures thereof.
41. The composition of any of paragraphs 37 to 40, wherein the diluent comprises at least 10% by weight of the one or more hydrofluorocarbons.
42. The composition of any of paragraphs 37 to 41, further comprising heating the slurry to a temperature ranging from 1° C. above to about 50° C. below the instability temperature of the slurry prior to extruding the slurry.
43. The composition of any of paragraphs 37 to 42, wherein the diluent comprises 1,1-difluoroethane, 1,1,1,2-tetrafluoroethane, or both.

44. The composition of any of paragraphs 37 to 43, wherein the diluent further comprises methyl chloride.

45. The composition of any of paragraphs 37 to 44, wherein the slurry has a slurry instability temperature of at least about −86° C.

46. The composition of any of paragraphs 37 to 45, wherein the slurry has a slurry instability temperature of about −40° C. to about −84° C.

47. The composition of any of paragraphs 37 to 46, wherein the slurry has a slurry instability temperature of about −45° C. to about −76° C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present disclosure, other and further embodiments of the disclosure can be devised without departing from the basic scope thereof, and the scope thereof is determined by the claims that follow.

What is claimed is:

1. A method for producing elastomers or elastomeric compositions, comprising:
    polymerizing one or more $C_4$ to $C_7$ isoolefins in the presence of a diluent comprising one or more hydrofluorocarbons in a reactor operated at slurry polymerization conditions;
    recovering from the reactor, a reactor effluent comprising a polymer product and a liquid reaction medium of unreacted monomer and the diluent;
    heating the reactor effluent to maintain the reactor effluent at a temperature ranging from 1° C. above to about 50° C. above the instability temperature of the reactor effluent;
    extruding the heated reactor effluent to separate at least a portion of the liquid reaction medium from the polymer product; and
    recycling the separated liquid reaction medium to the reactor.

2. The method of claim 1, wherein an extruder for extruding the reactor effluent is directly coupled to the reactor.

3. The method of claim 1, wherein an extruder for extruding the reactor effluent is directly coupled to a section of heated piping that is directly coupled to the reactor.

4. The method of claim 1, wherein the polymer product is selected from the group consisting of poly(isobutylene-co-alkylstyrene), star-branched butyl rubber, butyl rubber, and mixtures thereof.

5. The method of claim 1, wherein the elastomers or elastomeric compositions comprise at least one of poly(isobutylene-co-alkylstyrene), halogenated poly(isobutylene-co-alkylstyrene), star-branched butyl rubber, halogenated star-branched butyl rubber, butyl rubber, halogenated butyl rubber, and mixtures thereof.

6. The method of claim 1, wherein the diluent comprises at least 10% by weight of the one or more hydrofluorocarbons.

7. The method of claim 1, wherein the diluent further comprises methyl chloride.

8. The method of claim 1, wherein the diluent comprises 1,1-difluoroethane, 1,1,1,2-tetrafluoroethane, or both.

9. The method of claim 8, wherein the diluent further comprises methyl chloride.

10. The method of claim 1, wherein the heat is added to the reactor effluent while the reactor effluent is extruded.

11. The method of claim 10, wherein the heat is added to one or more zones of the extruder.

12. The method of claim 1, wherein the separated diluent is recycled from the extruder to the reactor.

13. The method of claim 1, wherein the effluent has an instability temperature of at least about −86° C.

14. The method of claim 1, wherein the effluent has an instability temperature of about −40° C. to about −84° C.

15. The method of claim 1, wherein the effluent has an instability temperature of about −45° C. to about −76° C.

16. The method of claim 1, wherein polymerization occurs at a temperature below the slurry instability temperature by at least an amount selected from the group consisting of 1° C., 2° C., 3° C., 4° C., 5° C., 10° C., 15° C., 20° C. and 50° C.

17. The method of claim 1, wherein the polymerization occurs at a temperature below the slurry instability temperature.

* * * * *